(12) United States Patent
Eldar et al.

(10) Patent No.: US 9,239,915 B2
(45) Date of Patent: Jan. 19, 2016

(54) SYNCHRONIZING BETWEEN HOST AND MANAGEMENT CO-PROCESSOR FOR NETWORK ACCESS CONTROL

(75) Inventors: Avigdor Eldar, Jerusalem (IL); Tal Roth, Jerusalem (IL); Hormuzd Khosravi, Portland, OR (US); Tal Shustak, Jerusalem (IL); Yael Yanai, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 993 days.

(21) Appl. No.: 11/904,322

(22) Filed: Sep. 26, 2007

(65) Prior Publication Data
US 2009/0083844 A1 Mar. 26, 2009

(51) Int. Cl.
  H04L 29/06 (2006.01)
  G06F 21/33 (2013.01)
  G06F 21/71 (2013.01)
  G06F 21/85 (2013.01)

(52) U.S. Cl.
  CPC .............. *G06F 21/33* (2013.01); *G06F 21/71* (2013.01); *G06F 21/85* (2013.01); *H04L 63/08* (2013.01); *H04L 63/0227* (2013.01); *H04L 63/162* (2013.01)

(58) Field of Classification Search
  USPC .......................................................... 726/11
  See application file for complete search history.

(56) References Cited

U.S. PATENT DOCUMENTS

| | | | |
|---|---|---|---|
| 2004/0054926 A1* | 3/2004 | Ocepek | H04L 29/12009 726/28 |
| 2004/0177276 A1* | 9/2004 | MacKinnon | H04L 63/0263 726/5 |
| 2006/0052085 A1* | 3/2006 | Gregrio Rodriguez | H04L 12/2859 455/411 |
| 2007/0002761 A1* | 1/2007 | Diamant | H04L 29/12009 370/252 |
| 2007/0006309 A1* | 1/2007 | Herbert | H04L 63/20 726/24 |
| 2007/0050842 A1* | 3/2007 | Smith | H04L 63/029 726/12 |
| 2007/0079151 A1* | 4/2007 | Connor et al. | 713/300 |
| 2007/0110244 A1* | 5/2007 | Sood | H04L 63/06 380/270 |
| 2007/0110245 A1* | 5/2007 | Sood | H04L 9/0844 380/270 |
| 2007/0156858 A1* | 7/2007 | Sood | H04L 63/102 709/220 |
| 2008/0022355 A1* | 1/2008 | Khosravi | H04L 61/2015 726/1 |
| 2009/0070467 A1* | 3/2009 | Khosravi | G06F 21/305 709/225 |

(Continued)

OTHER PUBLICATIONS

QuickStudy: Preboot Execution Environment by Russell Kay Feb. 13, 2006 12:00 PM ET (http://www.computerworld.com/s/article/108551/Preboot_Execution_Environment?taxonomyId=12&pageNumber=1).*

(Continued)

*Primary Examiner* — Harris C Wang
(74) *Attorney, Agent, or Firm* — Trop, Pruner & Hu, P.C.

(57) ABSTRACT

In network access controlled networks, it is desirable to prevent access to the network by any non-authenticated entities. Access control may be established through a trusted agent that, in some embodiments, may be implemented with a management co-processor. In some cases, active management technology may establish a connection while a host is inactive. Then, after the host becomes active, the host can attempt to use the management co-processor connection without obtaining the necessary authentications. This may be prevented, in some embodiments, by scanning for an active host and, if such an active host is found, blocking the host from using a layer 2 authentication channel unless the host is properly authenticated and has a proper Internet Protocol address.

8 Claims, 3 Drawing Sheets

(56) References Cited

U.S. PATENT DOCUMENTS

2009/0083844 A1* 3/2009 Eldar .................. G06F 21/33
  726/11
2009/0144807 A1* 6/2009 Zheng .................. H04L 63/08
  726/3

OTHER PUBLICATIONS

Zheng, Siyao, Xiang Long, and Jingwei Yang. "Using many-core coprocessor to boost up Erlang VM." Proceedings of the twelfth ACM SIGPLAN workshop on Erlang. ACM, 2013.*

* cited by examiner

SYNCHRONIZING BETWEEN HOST AND MANAGEMENT CO-PROCESSOR FOR NETWORK ACCESS CONTROL

BACKGROUND

This relates generally to the fields of data processing and data communication. Various embodiments relate to access controlled networks.

The proliferation of computer viruses and/or worm attacks in combination with the tendency for many of these malware mechanisms (e.g., worms, viruses, Trojan horses, rootkits) to propagate into corporate networks reinforces the movement for industry-wide development of network security measures to ensure that unauthorized and incompliant devices are not allowed access to various network assets. One manifestation of these efforts can be seen in the various proprietary and/or standards-based solutions for operating systems to measure various pertinent attributes of a host device. To eliminate, isolate, and reduce the impact and/or effects of malware, these measured attributes of a host device are now often evaluated, with the assistance of operating systems, before allowing that host device to connect to a protected network.

BRIEF DESCRIPTION OF THE DRAWINGS

The various embodiments will be described by way of exemplary configurations, but not limitations, illustrated in the accompanying drawings in which like references denote similar elements, and in which.

DETAILED DESCRIPTION

Network access control (NAC) technology provides enterprise platform security from host devices requesting network access. In a typical network access control protocol exchange, a host device or access requester provides data to an enterprise policy server to seek access to a network. The host device typically initiates a layer 2 authentication network connection (e.g., via IEEE 802.1x EAP-type protocol as defined in the IEEE 802.1X standard, IEEE std. 802.11X-2001, published Jul. 13, 2001) to a Network Access Device (NAD). A layer 2 or data link layer authentication involves the lowest network stack layer not requiring physical access and involves communication lines between networks as well as clients and servers.

This initial access request may be redirected to a policy decision point (PDP) in the network, thereby communicating the intent of the host device to connect to the network. Control channel connection requests are ultimately routed to a policy server equipped to make authorization decisions on network access requests, based on an administrative policy. Once a decision is made, a NAD or Policy Enforcement Point (PEP) controls if and how the host device is allowed onto the network.

A layer 2 authentication embedded trust agent may be utilized to implement network access control. The trust agent may constitute a supplicant in an active management technology (AMT). The supplicant allows the active management technology to communicate with 802.1.X networks. The active management technology is a subsystem in a computer platform. It is embedded, separate from the host operating system, and generally invisible to users. The 802.1X supplicant, in the form of active management technology, may take control of a network connection when a host is not operative, such as when it is not booted, when it is sleeping, hibernating, or when it has crashed.

When a host awakens or becomes booted and comes up, the host operating system may get access to the layer 2 authenticated network without authenticating itself by piggybacking on the connection that the active management technology enabled. This creates a security loophole by which users can get on an access controlled network without providing credentials by virtue of an active management technology connection.

This security loophole may be closed using a host/management co-processor synchronization scheme. Trusted agent firmware may check to see if a host has accessed a network connection established by the trusted agent's management co-processor. If so, the agent determines if the host has been properly authenticated with a valid Internet Protocol address.

Figure 1:
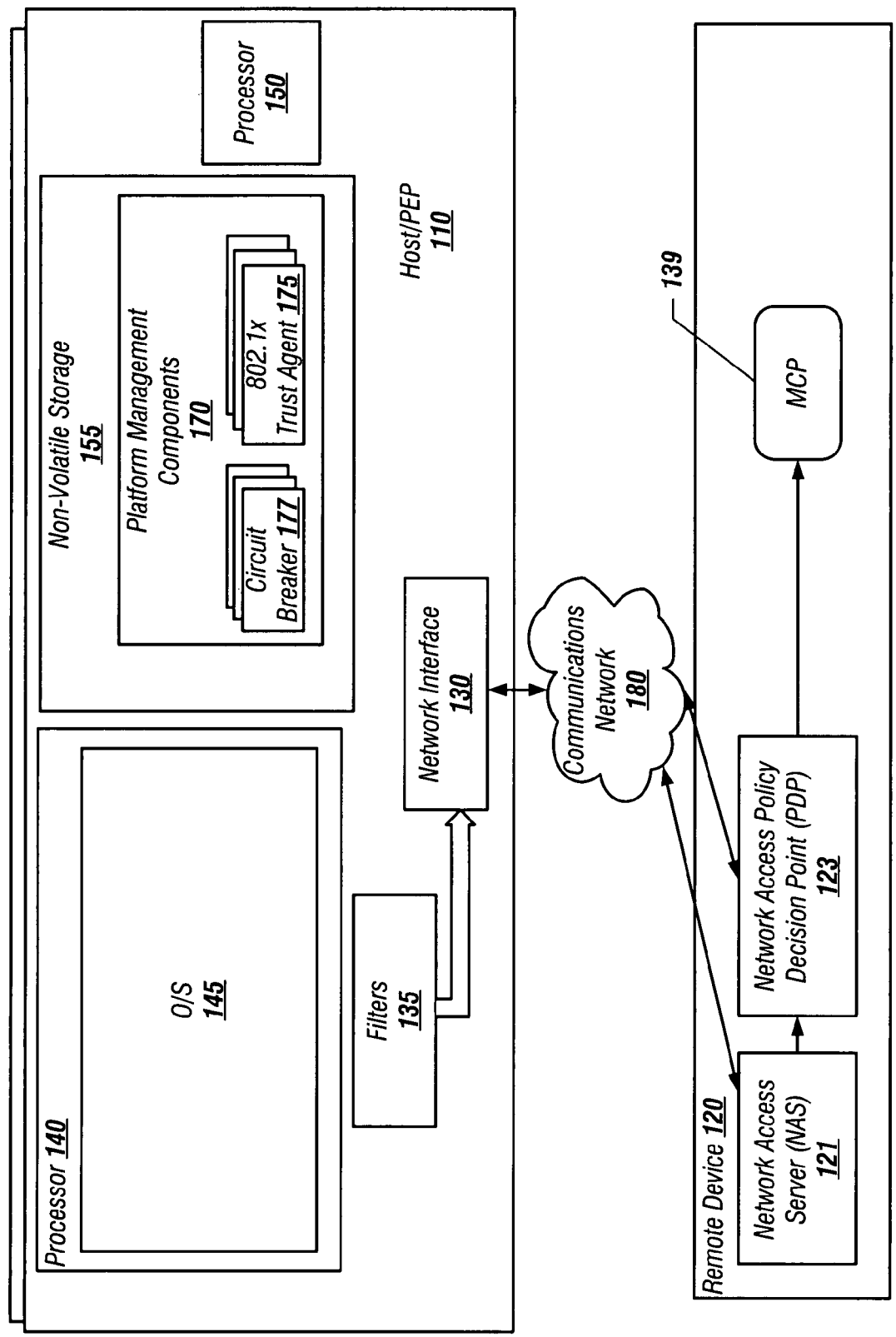
FIG. 1 is a block diagram of operating system independent secure network access by a host platform coupled with different network components in accordance with at least one embodiment.

Referring to FIG. 1, a high-level block diagram illustrates an overview of one embodiment. In some embodiments, a protocol conveys network access requests from the at least one host platform device 110 and at least one remote device 120. The at least one host platform device 110 subsequently receives network access determinations and/or related policy information which can then be enforced on the at least one host platform device 110.

One embodiment of the layer 2 authentication protocol uses an instantiation of an Extensible Authentication Protocol type-length-value (EAP-TLV) protocol infrastructure, a publicly accessible IEEE 802.1X EAP-type protocol, to facilitate a secure exchange between the at least one host platform device 110 and the at least one remote device 120. Institute of Electronic and Electrical Engineers (IEEE) Standard 802.1X-2001, ("Port Based Network Access Control"), approved Jun. 14, 2001, referred to herein as the "802.1X standard." However, other layer 2 authentication protocols may also be used.

The illustrated host platform device 110 includes a network interface 130, a first processor 140, a second processor 150, an operating system 145, and one or more platform management components 170, operationally coupled to each other as shown. The second processor 150 may be the management co-processor. The platform management components 170 are adapted to be executed by the second processor 150, independently of the operating system 145. Thus, the platform management components 170 may operate before the operating system 145 boots.

The network interface 130, coupled with the first processor 140 and/or the second processor 150, is configured to communicate with the at least one remote device 120 across communications network 180. The communication network 180 may include at least one gateway, router, bridge, switch, hub, repeater, and/or server. Additional or different components may be included in various embodiments of the host platform device 110 which are not illustrated in FIG. 1.

The remote device 120 may include a network access server 121. The server 121 may be coupled to a network access policy decision point (PDP) 123 coupled to a manageability coprocessor (MCP) 139.

A chipset may include the network interface 130 which may include a wired, wireless network interface card or any other like device for issuing network connectivity requests for access to the network 180. In one embodiment, the platform 110 requests connectivity via an 801.1X control channel.

In various embodiments, the platform management components 170 determine and sign information of the host platform device 110 via firmware agents 175, independently of the operating system 145. In one embodiment, firmware agents 175 exhibit at least two characteristics: 1) code executing within the host operating system 145 does not modify or tamper with firmware agent code, prevent firmware agent code from running, or circumvent operation of the firmware agent 175; and 2) trust agent 175 have exclusive access to certain host resources, for example filters 135 associated with the network interface 130 and unrestricted access to other resources, such as non-volatile storage 155 and associated controllers. In this manner, embodiments may provide a tamper resistant execution environment on host platform device 110 which may allow the host platform device 110 to act as a PEP acting on behalf of the network administrator to restrict or enable network access of the host platform device 110, based on detected operational conditions. In one embodiment, at least some platform operational conditions may be reported to the remote device 120.

In one embodiment, enforcement of various access control policies may require participation of run time environments, such as, for example, an operating system driver (not explicitly shown), management co-processor 150, active management technology, manageability engines (ME) (AMT-ME) (not explicitly shown), and AMT processors (AMT-P), input/output (I/O) devices, or, for example, an input/output controller depending on implementation choices. In one embodiment, an I/O filter rule may be implemented as a state machine for each peripheral device, individually or collectively, for all devices attached to a bus.

In one embodiment, a management co-processor (MCP) 150 may utilize an embedded trust agent 175 that does layer 2 authentications, such as an 802.1X and network admission control extensions, so that the MCP 150 can establish channels on the network 180. The management co-processor 150 may include a service processor or co-processor or any separate hardware or secure partition, thread or virtual machine, together with hardware or software modules. The MCP 150 may use AMT. Other embedded trust agents (chipset and firmware) provided on a chipset may also be used to authenticate with a network without using an operating system. Once MCP 150 establishes a network 180 connection, then other protocols may use MCP's connection (such as an AMT connection) to boot onto the network 180.

In accordance with some embodiments, a synchronization algorithm resident within the trust agent 175 determines if the host 110 is up and if the host supplicant has authenticated itself on the network 180 and obtained a valid Internet Protocol address. The algorithm determines if the host is authenticated without getting an Internet Protocol address or if it has obtained an incorrect or bogus Internet Protocol address that was assigned by a switch because the host did not authenticate properly, for example.

In such cases, the management co-processor 150 takes over the channel and authenticates the host itself. In addition, the management co-processor 150 may put in place circuit breaker (CB) filters 135 so the host 110 cannot communicate with the network 180 after the management co-processor 150 takes over. So, in any case, either the host has the channel or the management co-processor 150 has exclusive control over the channel.

Figure 2A:
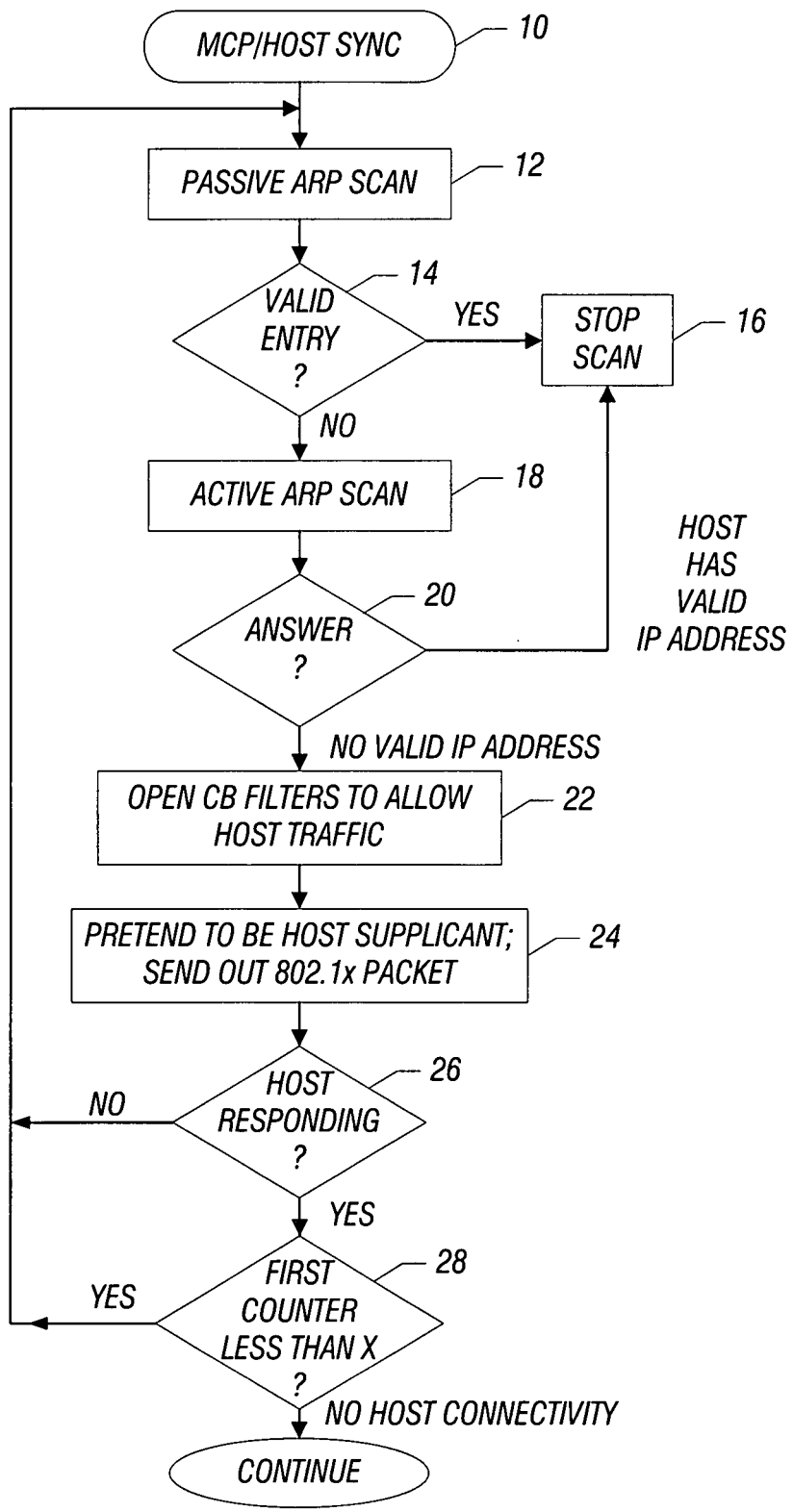
FIGS. 2A, 2B, and 2C are flow charts for one embodiment of the present invention.
Figure 2B:
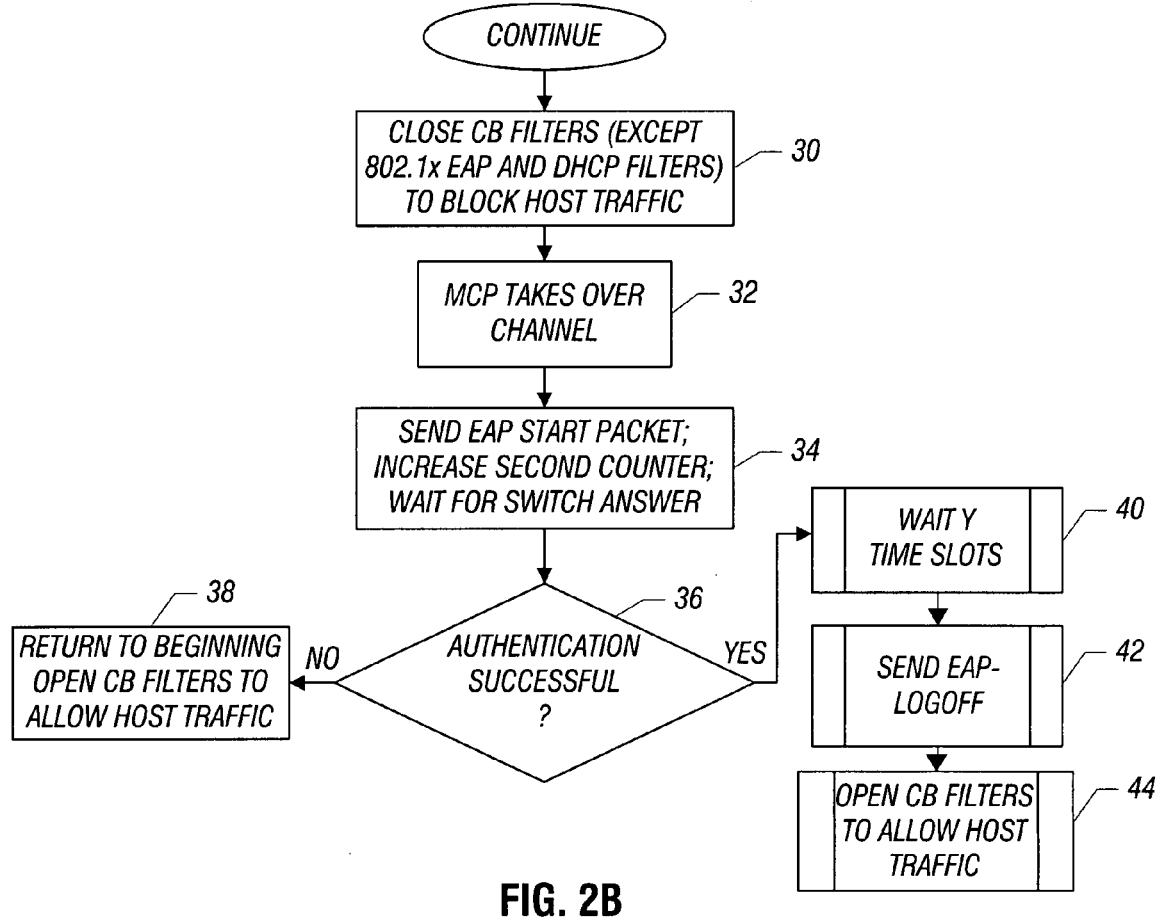
Figure 2C:
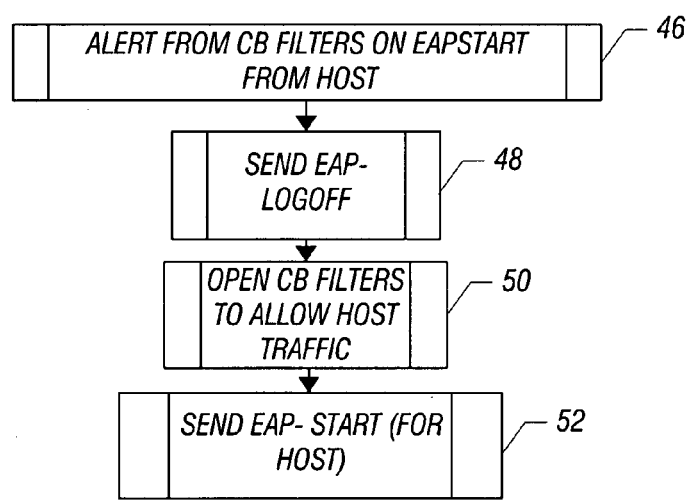

Turning now to FIGS. 2A, 2B, and 2C, methods, in accordance with various embodiments, are described in terms of computer firmware, software, and hardware with reference to a state or flow diagrams. In various embodiments, portions of the operations to be performed by a host platform device and/or remote devices may constitute state machines or computer programs made up of computer-executable instructions. These instructions are typically maintained in a storage medium accessible by the host platform device and/or remote devices.

A storage medium includes any mechanism that provides (i.e., stores and/or transmits) information in a form readable by a machine (e.g., a computer). For example, a storage medium includes read only memory (ROM), random access memory (RAM), magnetic disk storage media, optical storage media, flash memory devices, electrical, optical, acoustical or other form of propagated signals (e.g., carrier waves, infrared signals, digital signals), and the like.

Describing the methods by reference to a flow diagram enables one skilled in the art to develop such programs, including instructions to carry out the methods on suitably configured host platforms and/or remote devices. In various embodiments, at least one of the processors of a suitably configured host platform and/or remote device executes the instructions from the storage medium. In various embodiments, the computer-executable instructions may be written in a computer programming language or may be embodied in firmware logic, reconfigurable logic, a hardware description language, a state machine, an application-specific integrated circuit, or combinations thereof. If written in a programming language conforming to a recognized standard, such instructions may be executed on a variety of hardware platforms and may interface with a variety of operating systems.

The present embodiments are not described with reference to any particular programming language. A variety of programming languages may be used to implement the teachings of the embodiments as described herein. Furthermore, it is common in the art to speak of software in one form or another (e.g., program, procedure, process, application, etc.) as taking an action or causing a result. Such expressions are merely a shorthand way of saying that execution of the software by a network device causes the processor of the computer to perform an action or produce a result.

Referring to FIG. 2A, the management co-processor/host synchronization algorithm 10 may be resident in one embodiment in the trust agent 175. Initially, the algorithm 10 implements what may be called a passive address resolution protocol (ARP) scan (block 12). See An Ethernet Address Resolution Protocol, Network Working Group, Request for Comments: 826, November 1982. A passive ARP scan is a scan of the firmware within the trust agent 175 and, particularly, within an ARP table. The purpose of the passive ARP scan is to determine whether the host 110 is on the active management technology established channel. This passive ARP scan attempts to determine whether the host has gotten a valid Internet Protocol address. This can be determined from the firmware ARP table.

If a valid entry is detected at diamond 14, then the scan is stopped at block 16. In other words, if there is a valid entry, then it has been determined that the host is on the channel, but it has a suitable Internet Protocol address.

If no valid entry is identified in diamond 14, then an active scan may be undertaken at block 18. It is still possible that the host is on the connection, without a valid Internet Protocol address. In an active ARP scan, the firmware ARP table is actively scanned to determine if the host is on the channel.

In an active ARP scan, ARP requests are sent to see if the host gets an ARP response back. This determines whether the host has a valid Internet Protocol address. If there is an answer, as determined in diamond 20, then the host has a valid Internet Protocol address and the scan is stopped at block 16.

Otherwise, if no valid Internet Protocol address is identified at diamond 20, then the circuit breaker filters 135 are opened to allow host traffic on the channel, at block 22. Then, the management co-processor 150 pretends to be the unauthenticated host supplicant, at block 24. It may do this, in one embodiment, by sending an EAP start authentication packet on behalf of the host and by increasing a first EAP start packet counter by one. A check at diamond 26 determines whether the host is responding, as indicated by the receipt of an EAP start authentication packet. An EAP start authentication packet is the way a series of EAP messages are initiated, culminating in authentication. If the host does not respond, the flow iterates.

If an EAP response packet is received from the host, a check at diamond 28 determines, in one embodiment, whether the first EAP start authentication packet counter is still less than a predetermined value X, after having been incremented at block 24. An EAP response packet is a recognized response to an EAP request identity message, that response packet including the identity of the host. If the EAP count is still less than X, the flow iterates back to the passive scan 12. If it is no longer less than X, then the flow continues in FIG. 2B, having determined that there is no host connectivity to the outside world. The value X can be set to cause sufficient repetition to achieve a desired reliability. For example, in one embodiment, X is three.

Moving to FIG. 2B, at block 30, some of the circuit breaker filters 135 that were opened are now closed to block host traffic. However, the 802.1xEAP and Dynamic Host Configuration Protocol (DHCP) files may remain open. MCP 150 takes over the channel at block 32. The active management technology sends an EAP start authentication packet at block 34. It also increases a second EAP start authentication counter by one and waits for an answer from the switch that provides channel communications.

When an EAP start packet comes from the host, that start authentication packet does not go out on the channel initially. Instead, an alert is sent to the MCP 150 so that the host generated EAP start authentication packet does not interfere with the MCP 150 controlled channel. However, if there is a host supplicant trying to get on the network, the manageability engine needs to get out of the way as soon as possible, deeding the channel to the host supplicant.

Thereafter, at diamond 36, a check determines whether authentication is successful. If so, in block 40, the flow waits a given number of time slots to determine if the host is getting on the network. Then an EAP log off is sent to log MCP 150 off the channel (block 42) and the circuit breaker filters 135 are opened to allow host traffic (block 44).

Otherwise, at block 38, the circuit breaker filters 135 are opened to allow host traffic and the flow iterates back to the passive scan at block 12.

At block 30, in FIG. 2B, an alert filter may be called. Calling the alert filter enables an alert to be generated to indicate that the host is attempting to gain access to the channel. An example would be where the user leaves his system for awhile, and during that period, MCP 150 takes over the channel. The user may return to the user's computer and expect to be able to access the channel, which is now occupied by the MCP 150.

The flow of FIG. 2C enables automatic taking away of control, from the MCP 139, back to the user. At block 46, in FIG. 2C, an alert from CB filters is issued to the manageability engine on receipt of an EAP start authentication packet from the host. As an example, when the user attempts to access a computer, an alert is generated in response to an EAP start authentication packet from the host. Then, an EAP log off is initiated, at block 48, to automatically log MCP 150 off the channel. The CB filters 135 are then opened to allow host traffic in block 50. Then the EAP start authentication packet is sent as a proxy for the host message in block 52.

In this way, a security loophole may be closed that would have enabled an unauthenticated host to gain access to an authenticated network through an MCP 150 established channel. The synchronization protocol prevents such access and thereby closes the loophole. Moreover, network security can be maintained using a management co-processor 150 to control a layer 2 authenticated channel before the operating system 145 has booted on the processor 140.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A non-transitory computer readable medium storing instructions that are executed to enable a management co-processor hardware to:
   after a host processor becomes operative determine, using the management co-processor hardware separate from said host processor, whether said host processor is authenticated;
   if the host processor is not authenticated, send a packet on behalf of the host processor and determine whether the host processor responds;
   take control of an extensible authentication protocol channel between said host processor and a remote device when the host processor does not respond to the packet sent on behalf of the host processor;
   and allow the host processor to communicate over the channel controlled by said hardware once said host processor is authenticated.

2. The medium of claim 1 further storing instructions to enable host traffic on the channel and to send a packet on behalf of the host and determine whether the host processor responds.

3. The medium of claim 2 further storing instructions to repeatedly send a packet on behalf of the host processor and repeatedly determine if the host responds.

4. The medium of claim 2 further storing instructions that, if the host processor does not respond with a packet, blocking host traffic.

5. The medium of claim 1 further storing instructions to cause a management co-processor firmware agent to cede the channel to the host processor in response to detection of a host processor generated packet for starting layer 2 authentication.

6. A system comprising:
   a first and second processor, said second processor being a management co-processor hardware
   wherein said second processor:
   determines whether said first processor is authenticated after the first processor becomes operative, and if the host processor is not authenticated said second processor sends a packet on behalf of the first processor to determine whether the first processor responds;

takes control of an extensible authentication protocol channel between said host processor and a remote device when the host processor does not respond to the packet sent on behalf of the host processor;

and allows only the authenticated first processor to communicate over the channel authenticated by the management co-processor hardware;

and a network interface coupled to said processors, said channel to enable communication over said network interface.

7. The system of claim 6 wherein said management co-processor hardware implements active management technology.

8. The system of claim 6, said co-processor hardware to detect when the host is active on the channel.

* * * * *